United States Patent [19]

Redker

[11] 4,098,649
[45] Jul. 4, 1978

[54] CONVERSION OF ORGANIC WASTE MATERIAL

[75] Inventor: Donald S. Redker, Haslett, Mich.

[73] Assignee: Redker-Young Processes, Inc., Lansing, Mich.

[21] Appl. No.: 655,395

[22] Filed: Feb. 5, 1976

Related U.S. Application Data

[63] Continuation-in-part of Ser. No. 467,124, May 6, 1974, abandoned.

[51] Int. Cl.² ............................................. C10B 53/02
[52] U.S. Cl. .................................... 201/2.5; 201/8; 201/21; 201/25; 201/30; 201/32; 201/44; 202/118; 264/29.1; 264/349; 264/DIG. 69
[58] Field of Search ............... 264/349, 37, 29.1, 29.7, 264/DIG. 69; 201/2.5, 5, 8, 32, 25, 30, 40, 44; 202/118

[56] References Cited

U.S. PATENT DOCUMENTS

| | | | |
|---|---|---|---|
| 1,548,307 | 8/1925 | Giger | 202/118 |
| 1,846,982 | 2/1932 | Yeomans | 201/5 |
| 1,898,326 | 2/1933 | Wahlstrom | 264/29.1 |
| 1,929,649 | 10/1933 | Pier et al. | 201/30 |
| 2,554,082 | 5/1951 | Anderson | 23/290.5 |
| 3,254,143 | 5/1966 | Heitman | 264/29.7 |
| 3,257,081 | 6/1966 | Brown et al. | 264/37 |
| 3,362,887 | 1/1968 | Rodgers | 201/2.5 |
| 3,691,019 | 9/1972 | Brimhall | 202/118 |
| 3,772,242 | 11/1973 | Liska et al. | 201/25 |
| 3,787,292 | 1/1974 | Keappler | 202/118 |
| 3,956,981 | 5/1976 | Pitt | 264/176 R |
| 3,971,704 | 7/1976 | Von Klenck et al. | 201/40 |

*Primary Examiner*—Jeffery R. Thurlow
*Attorney, Agent, or Firm*—Irvin L. Groh

[57] ABSTRACT

Apparatus and the method of converting organic material such as that separated from municipal and industrial waste into useful products by using a form of an extruder in a continuous destructive distillation process and in which the material being processes is compressed in the extruder in the absence of air and is heated to carefully controlled temperatures in separate zones to extract different products from each of the zones.

9 Claims, 1 Drawing Figure

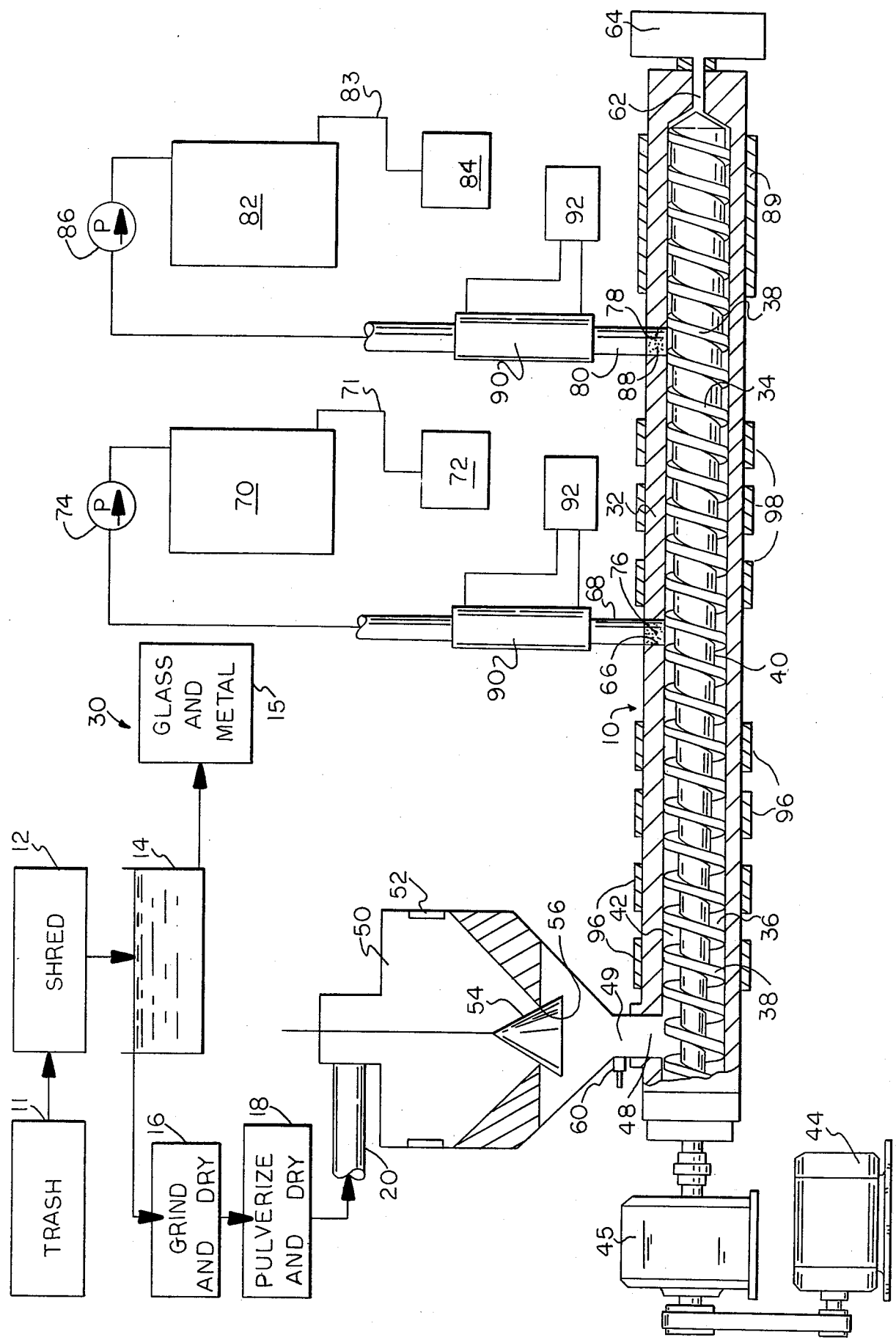

CONVERSION OF ORGANIC WASTE MATERIAL

SUMMARY OF THE INVENTION

This is a continuation-in-part application of application Ser. No. 467,124 filed May 6, 1974, now abandoned.

This invention relates to the destructive distillation of organic material salvaged from trash or garbage and more particularly, to the use of an extruder as a retort in such destructive distillation operation.

In the disposal of industrial and municipal waste, attempts have been made to salvage portions of the basic materials such as metals and the like, but organic material has usually been incinerated or buried in landfill areas. Incineration is unsatisfactory since it only reduces the volume of the material which must be disposed of and the fumes and smoke plus the expense of incineration is objectionable and prohibitive. Burying the waste in landfill areas is unsatisfactory since much of the organic material is inert and destroys the land for useful purposes such as growing crops.

Attempts have been made to destructively distill organic material, but such operations require batch type of distillation by which a given quantity of waste is distilled in any given period of time. However, such operations are not satisfactory for disposing of large quantities of waste and have only limited application. Also attempts have been made to destructively distill such material in a continuous process by using conveyors in retorts which usually are heated to a single maximum temperature causing gases to be driven off and the residue to be disposed of in the form of char. In both types of operations the purpose is to dispose of the organic material. Even when attempts are made to salvage material from the organic waste, the usual single temperature arrangement results in a mixture of various gases and liquids which are of limited or little use since they require additional complex processes to clean and separate them into useful products.

It is an object of the invention to provide an apparatus and method for continuously destructively distilling organic material such as separated from trash.

It is another object of the invention to provide a method and apparatus for continuously feeding organic material to a retort in the form of an extruder from which all air is excluded and which is heated in different zones from which gases are separately removed.

In accordance with the present invention, organic material separated from trash is continuously fed to retort in the form of an extruder to compress the material which is heated in the absence of air in an initial zone and gases are extracted therefrom. Thereafter, the extruder is heated in a subsequent zone or zones at higher temperatures and gases are separately extracted from each of the zones. In a final zone, the extruder-retort and the contents therein are cooled and the residue is extracted in solid form. Also gases extracted at the various zones can be treated by passing them through pipes or conduits brought to a red heat to convert the gases to still other gases prior to delivery to a condenser for storage or separation.

DESCRIPTION OF THE DRAWING

The drawing is a schemmatic view in flow diagram form of apparatus and the method of destructive distilling in accordance with the present invention.

DETAILED DESCRIPTION

Referring to the drawing, a preferred method by which trash can be separated into organic and inorganic material is illustrated in flow form, and the apparatus by which the organic material is distilled is indicated generally by the reference character 10.

Trash including both inorganic materials such as metals and glass and organic material such as paper, wood, plastic and vegetable matter are brought to a delivery station indicated at 11. The trash is subsequently shredded into small particles at a second station 12 from which it may be delivered to a liquid floatation tank indicated at 14. Such a tank can be filled with water and the fragments of organic material such as paper, wood, garbage and plastic will tend to float while the heavier inorganic material such as metals and glass will sink to the bottom where they may be extracted continuously or periodically and conveyed to a station 15 for further processing.

The organic material which tends to float in the tank 14 is removed for drying and grinding at a subsequent station 16 so that the material is formed into finer, drier particles. Thereafter, the organic material is pulverized and dried additionally at a station 18 into more or less uniform sized fragments.

From the station 18, the pulverized organic materials may be delivered to a conduit 20 for delivery to the retort apparatus indicated at 10.

The processing of organic material which is removed from trash occurs in the retort 10 which is in the form of an extruder of a type similar to that used in the plastic industry but which is operated continuously as a retort. The extruder includes an elongated barrel 32 in which a helical screw 34 is supported for rotation in the bore 36 of the barrel 32. Preferably the bore 36 of the barrel is of uniform diameter throughout its length. The screw 34 has flight portions 38 of uniform pitch and a root portion 40 which increases in diameter from one end to the other of the screw. With this configuration, the cross sectional area of the material confining cavity 42 formed between the interior of the barrel bore 36 and the root of the screw 34 decreases from one end of the screw 34 to the other. The cross sectional area need not decrease uniformly and it is contemplated that the cross sectional area may be diminished in stages or zones.

Extruder screw 34 is continuously driven for rotation by a motor 42 through a gear reduction unit indicated at 45.

Adjacent the driven end of the screw 34, or at the left as viewed in the drawing, is a radially extending feed opening 48 passing through the wall of the barrel 32. The feed opening 48 communicates with the throat 49 of a material receiving hopper 50. The hopper 50 is enclosed and is connected with the conduit 20 to continuously receive pulverized material. Ports or vents 52 are provided in the hopper 50 to remove as much air as possible as the material is being introduced into the feed opening 48 of the extruder.

A cone like closure member 54 is provided to control an opening 56 in the hopper 50. The closure member 54 is balanced to move from a closed position when the hopper 50 is empty to an open position when material is being introduced to the hopper. The closure 54 acts to obstruct the escape of gases from within the extruder and prevents the introduction of air when the feed of material to the hopper 50 is interrupted.

A vibrating device 60 may be connected to the throat of the hopper to insure that the feed of the pulverized organic material to the throat 48 is uniform.

The right end of the barrel 32 is provided with a restricted discharge opening 62 which may communicate with a variety of extruder dies, molds, or pelletizers, all of which are indicated generally as located at 64.

A gas discharge or vent port 66 is provided in the wall of the barrel 32 in axially spaced relation to the hopper throat 49. The discharge port 66 communicates with a pipe or conduit 68 to a condenser 70 which may communicate through a line 71 with a storage tank 72. The condenser 70 is used to condense and separate various gases and volatiles which are received from the conduit 68. A vacuum pump 74 may be disposed in the conduit 68 to assist in removal of gases from the port 66 to the condenser 70.

The discharge opening 66 is provided with a ceramic filter 76 which permits the escape of gases from the cavity 42 within the barrel 32 but prevents the discharge of solid material.

A second discharge port 78 which is similar to the discharge port 66 is connected by way of a separate pipe or conduit 80 to a condenser 82. The condenser 82 is connected through a line 83 to a storage tank 84 and a vacuum pump 86 is provided in the conduit 80 to assist the removal of gases from the port 78. The port 78, like the discharge port 66, is provided with a ceramic filter 88.

The barrel of the extruder 32 between the discharge port 78 and the discharge opening 62 in the right end of the extruder barrel 32 is formed with a jacket 89 to receive coolant such as water or air for the purpose of cooling the end portion of the barrel and its contents.

Each of the conduits 68 and 80 are provided with a separate heating unit 90 such as an induction heating unit supplied with electrical energy controlled from a source 92. The heating units 90 are employed to heat pipes or conduits 68 and 80 to a red heat to process and bring about chemical reactions in the gases passing through the conduits.

The extruder barrel 32 between the feed opening 48 and the discharge port 66 is provided with a plurality of electrical heating elements 96 by which the barrel 32 of the extruder and its contents may be heated. Such heating units are conventional and can employ the usual thermostatic controls and source of electrical power so that the temperature of the heating units can be adjusted and varied. Also disposed between the discharge port 66 and the discharge port 78 is another plurality of heating units 98 which are powered and controlled similarly to the heating units 96.

The separated organic material which has been pulverized and dried is fed continuously through the conduit 20 to the hopper 50. The entering material opens the closure member 54 and permits passage of material to the throat 49 and into the the extruder barrel 32. The extruder screw is rotated continuously and advances the material from the feed opening 48 toward the discharge opening 62 at the right end of the extruder. During such advancement, the cavity 42 is maintained completely full of material. The screw is preferably of the type which diminishes the material containing volume of the chamber 42 in the barrel 32 as the discharge end of the extruder is approached. This coupled with the relatively restricted discharge opening 62 causes force to be exerted on the material within the chamber 42 so that the material is compressed by the action of the screw. This compression of the material also increases its temperature which is further supplemented and controlled by the electrical heating bands 96 so that both the barrel and its contents are heated.

As the material approaches the first discharge port 66, it is heated to an elevated temperature which may be selected at some predetermined level, for example in the range of 40° to 600° fahrenheit. As the material reaches the discharge port 66, gases from the organic material are expelled through the ceramic filter 76 to the conduit 68 and to the condenser 70. The remaining solid material in the barrel 32 is advanced from the discharge port 66 in a second zone toward the discharge port 78.

The additional heating elements 98, which may be of the induction heating type, are disposed in the zone between the discharge ports 66 and 78. These heating elements are used to raise the temperature of the barrel and its contents to a selected predetermined higher level, for example to as much as 1500° fahrenheit. The material between the ports 66 and 78 is advanced, is heated and is further compressed due to the action of the screw so that as the material reaches discharge port 78, additional gases escape through the ceramic filter 88 and through the conduit 80 to the condenser 82. Because of the higher temperature employed in this zone, the gases escaping through the conduit 80 will be of a different chemical composition than the gases passing through the conduit 68.

The material within the barrel as it reaches the discharge port 78 will have been greatly diminished in volume but what material remains is conveyed to the right maintaining the cavity 42 in the barrel completely filled with material which is advanced through the cooling zone. The remaining material will contain some volatiles and it is preferred that the barrel be cooled to a temperature of 200° fahrenheit or less to insure that when the char material is extruded through a die or other mechanism at the location 64, it will not ignite upon being exposed to the air. The material extruded through the discharge opening 62 may be formed by dies or molds and be cooled for subsequent use such as fuel.

During continuous rotation of the screw 34, the barrel 34 of the extruder remains completely filled with material. Air is excluded from entering the left end of the extruder by the constant flow of material from the hopper 50 and the screw flights adjacent the left end of the extruder screw which coact with walls of the bore 36 of the barrel. Similarly, air is prevented from entering the discharge end of the barrel by the screw flights 38 at the right end of the screw which coact with the barrel bore 36 and also by the compacted material being forced through the discharge opening 62.

The gases which are escaping from the heated organic material through the port 66 will include methane, some ethane, carbon monoxide and carbon dioxide. It has been found that by heating of the conduit to a red heat, for example with induction heaters, certain of the gases will be combined. The gases such as methane, for example, will yield olefins with the elimination of hydrogen to form higher energy gases than those being delivered from the port 66 to the conduit 68.

Similarly, the volatiles leaving the port 78 will condense into such liquids as acetic acid, methyl alcohol and acetone. By employing the induction heater to bring the conduit 80 to a red heat, the volatiles, instead of passing to the condenser for conversion to liquids, will be reduced in the conduit 80 to the olefin and parafin series of gases.

The heating of the conduits 68 and 80 is optional depending on the gases or liquids which it is desired to obtain from the organic material being processed. If, for example, the volatiles issuing from the port 78 are desired, the heating of the conduit 80 can be discontinued.

It should be understood that heated zones in addition to the two zones which have been discussed may be provided to heat the material in the barrel to still higher temperatures and that more than one discharge port may be associated with each of the zones to deliver gases to the condensers and storage facilities associated with each of the zones.

Reference has been made to the processing of organic material separated from trash but it should be understood that other organic materials and other carbonaceous materials such as coal and oil shale can be processed in a similar manner.

It will be seen that a continuous destructive distillation process is carried out in an extruder apparatus which is operated as a retort so that solid waste, such as organic material salvaged from trash, can be fed to a continuously operated extruder from which air is excluded. Material is compressed within the extruder barrel by the action of the screw which acts with the barrel to form a cavity having a diminishing volume from one end to the other of the barrel. The compressed material is subjected to heat in separate zones of the extruder so that the material is converted to useful gases and liquids which are extracted from separate zones or stations and that the residue of the material is discharged from the extruder and forms useful products such as fuel.

What is claimed is:

1. The method of destructive distillation of organic waste material comprising; the steps of pulverizing and drying said organic material, continuously delivering said pulverized and dried material to one end of an extruder having an elongated barrel and a screw therein in which the volume within said barrel is greater at said one end than the other, continuously advancing said material from one end of said barrel to the other in the absence of air, exerting force on said material by said screw while it being advanced in said barrel to compress the material, heating the material in a first zone of said barrel to a first temperature to initiate volatilization of the material, extracting gases from said barrel at the end of said zone, heating the material in a second zone of said barrel to a second and substantially higher temperature, extracting gases from said barrel at the end of said second zone, cooling the material in a final zone of said barrel, and extracting residue of said material from said final zone.

2. The method of claim 1 in which the temperature of the material in said final zone is less than the temperature of the material at the end of said first zone.

3. The method of claim 1 in which the force exerted on said material is increased progressively from one end to the other of each of said zones.

4. The method of claim 1 in which the material is confined in said barrel and the volume of the material is reduced uniformly from one end to the other of each of said zones to compress said material.

5. The method of claim 1 in which material is delivered to the barrel of the extruder to maintain the barrel completely filled with material as it is advanced from one end of the barrel to the other.

6. The method of destructive distillation of organic waste material comprising; the steps of pulverizing and drying said organic material, continuously feeding said pulverized and dried organic material from one end to the other through an elongated barrel of an extruder in which the material containing volume within said barrel decreases from one end to the other to apply pressure to said material, said feeding occurring in the absence of air in said extruder, heating successive and separate zones of said extruder barrel to successively increase the temperature levels in each of said zones, a first one of said zones being heated to a temperature in a range of 400° to 600° F to initiate volatilization of said material, extracting gases from each of said zones and conveying them separately to storage facilities, and cooling a final zone of said extruder and extruding solid residue from said final zone.

7. The method of claim 6 in which the gases extracted from at least one of said zones are heated to a temperature greater than the temperature of the associated zone to convert the extracted gases to other gases prior to delivery to said storage facilities.

8. The method of claim 1 wherein the gases which are extracted from said first and second zones are conveyed to respective condensers.

9. The method according to claim 8 wherein said gases which are extracted from one of said zones are heated to a temperature greater than the temperature in the zone from which they are extracted and prior to delivery to the associated condenser to convert the extracted gases to still other gases.

* * * * *